(12) United States Patent
Vance

(10) Patent No.: US 10,149,457 B2
(45) Date of Patent: Dec. 11, 2018

(54) INTERACTIVE OUTDOOR FEED-DISPENSING CONTAINER AND METHODS OF MANUFACTURE AND USE

(71) Applicant: John Cullen Vance, Houston, TX (US)

(72) Inventor: John Cullen Vance, Houston, TX (US)

( * ) Notice: Subject to any disclaimer, the term of this patent is extended or adjusted under 35 U.S.C. 154(b) by 0 days.

(21) Appl. No.: 15/643,830

(22) Filed: Jul. 7, 2017

(65) Prior Publication Data
US 2018/0242554 A1    Aug. 30, 2018

Related U.S. Application Data

(63) Continuation of application No. 62/360,312, filed on Jul. 8, 2016.

(51) Int. Cl.
| | |
|---|---|
| *A01K 5/02* | (2006.01) |
| *A01K 5/01* | (2006.01) |
| *A01K 15/02* | (2006.01) |
| *B29L 22/00* | (2006.01) |
| *B29K 105/00* | (2006.01) |
| *B29C 41/04* | (2006.01) |

(52) U.S. Cl.
CPC .................. *A01K 5/02* (2013.01); *A01K 5/01* (2013.01); *A01K 15/025* (2013.01); *B29C 41/042* (2013.01); *B29K 2023/06* (2013.01); *B29K 2105/251* (2013.01); *B29L 2022/00* (2013.01)

(58) Field of Classification Search
CPC .......... A01K 5/0114; A01K 5/02; A01K 5/01; A01K 5/0107; A01K 5/0233; A01K 15/025
See application file for complete search history.

(56) References Cited

U.S. PATENT DOCUMENTS

| | | | | |
|---|---|---|---|---|
| 1,190,028 A | * | 7/1916 | Smith | A01K 5/0241 119/53.5 |
| 3,645,422 A | * | 2/1972 | Cretors | A47J 37/047 222/169 |
| 5,054,657 A | * | 10/1991 | Morse | A47F 1/03 198/658 |
| 5,957,082 A | * | 9/1999 | Budman | A01K 5/0114 119/54 |
| 6,158,391 A | * | 12/2000 | Simonetti | A01K 5/0114 119/702 |
| 6,237,583 B1 | | 5/2001 | Ripley et al. | |
| 6,526,912 B1 | | 3/2003 | Ottoson | |
| 6,557,496 B2 | * | 5/2003 | Herrenbruck | A01K 15/025 119/707 |

(Continued)

FOREIGN PATENT DOCUMENTS

| | | |
|---|---|---|
| AU | 2014233543 A1 | 4/2015 |
| CN | 103960152 B | 8/2014 |

*Primary Examiner* — Trinh T Nguyen
(74) *Attorney, Agent, or Firm* — Erdos Intellectual Property Law; Raina Haque

(57) ABSTRACT

A large animal feed dispensing container and method of manufacturing the container and method of using the device for delivering a controlled amount of feed to large animals in an outdoor. The housing unit and transecting plate may be molded as a single fused piece. The housing unit includes small openings intended for dispensation in the first chamber that contains feed. The housing unit contains a container for ballast material keep the feed-dispensing container to stabilize the feed-dispensing container in one location.

9 Claims, 8 Drawing Sheets

(56) References Cited

U.S. PATENT DOCUMENTS

| | | | |
|---|---|---|---|
| 8,082,882 B1 | 12/2011 | Tharp | |
| 8,225,747 B2 | 7/2012 | Markham et al. | |
| 8,474,404 B2 * | 7/2013 | Costello | A01K 15/025 |
| | | | 119/51.01 |
| 8,584,620 B2 * | 11/2013 | Rutherford | A01K 15/025 |
| | | | 119/707 |
| 8,640,647 B2 | 2/2014 | Dotterer | |
| 8,820,268 B2 * | 9/2014 | Valle | A01K 15/025 |
| | | | 119/710 |
| 8,997,689 B2 | 4/2015 | Ragonetti | |
| 2011/0083608 A1 * | 4/2011 | Markham | A01K 5/0114 |
| | | | 119/51.01 |
| 2011/0139815 A1 | 6/2011 | Benson | |
| 2014/0060441 A1 * | 3/2014 | Baxter | A01K 5/0291 |
| | | | 119/61.5 |
| 2015/0128875 A1 * | 5/2015 | Christianson | A01K 5/0114 |
| | | | 119/707 |
| 2016/0095296 A1 | 4/2016 | Ishikawa | |
| 2017/0223926 A1 * | 8/2017 | Ausman | A01K 5/0283 |

* cited by examiner

INTERACTIVE OUTDOOR FEED-DISPENSING CONTAINER AND METHODS OF MANUFACTURE AND USE

CROSS-REFERENCE TO RELATED APPLICATION

This application claims the benefit of U.S. Provisional Application No. 62/360,312, filed Jul. 8, 2016.

TECHNICAL FIELD

The present disclosure relates generally to a mechanical animal-feed dispensing container and methods of manufacture and methods of use of embodiments of such containers adapted for using the container to interact with target outdoor animals and withstand the elements of the outdoor and wild environments so that the container may be found by an animal handler and reused in the same or a different location.

BACKGROUND

The controlled feeding of outdoor animals presents several challenges. Animal handlers are often not available to dole out appropriate, meal-sized portions; thus, large amounts of food are supplied to the large animals and these animals are left to feed themselves. This issue results in several problems. One problem is overeating, which leads to unhealthy animals. Another challenge is the expense in time and cost associated with the frequent replenishment of food when an animal (or animals) binge eats an entire food portion presented. Another problem is the theft of food by pest animals, such as birds, raccoons, and deer, which wastes the food and also requires expensive replenishment of the stolen food.

Another challenge presented when feeding large animals is inherent to many undomesticated animals. Many animals have adult sizes that are far larger than those of more common domesticated animals such as cats or dogs. Not only do these larger sizes require greater amounts of food, but the food dispensers must be able to withstand forceful impact of animals while simultaneously being able to house a great volume of feed to meet the animal's metabolic and nutritional demands. There is a need for devices capable of containing greater volumes of feed for larger animals that are also able to withstand the forceful impact of large animals.

Handlers are liable to be hurt by animals of considerable size or weight if the animals act unpredictably or uncontrollably. The handler's proximity to the animal in these situations increases his or her risk of injury and/or death. There is also a need for devices that can help train these animals without requiring the close proximity of an animal handler.

While the technology of the prior art discloses rolling treat dispensers for small domesticated animals, even some which use ballasts to maintain the same approximate position, none address the additional concerns of feeding and training large and heavy outdoor ungulated animals that do not have the ability to rotate their own forelimbs. Many of these larger animals go through rapid weight and strength increases during their lifespans, yet the prior art dispensers have a fixed ballast mechanism that is not optimal for these animals in all stages of life. The prior art contains outdoor feed dispensers are physically tethered to a fixed location. Such tethering often does not allow animals to interact playfully with the dispensers. The tethering is vulnerable to damage and breakage. The tether often poses a danger to humans and animals who may trip over it or get tangled within it. The prior art also discloses animal feed dispensers that are so freely moveable and light-weight when the feed is near-empty, that animals are able to move them great distances. In those situations, the animal handlers face the frustrating and expensive task of having to find or even replace such dispensers.

Notwithstanding the advancements made in the prior art in the field of animal food dispensers, there remains a need for a food dispensing container designed for use with outdoor animals in an outdoor setting. There is a need for a large durable container can be played with by a large animal, help train the large animal, and yet be easily locatable by the animal handler even when the feed in the container is near depletion. Disclosed herein are one or more devices that advantageously addresses these issues.

It is a challenge to manufacture a large feed dispensing container that can hold as much as 3 cubic feet of feed and that withstands the force of an animal that weighs more than the average adult human. It is especially challenging to manufacture a large feed dispensing container with components that are not easily severed. Disclosed herein is a method of manufacturing a feed dispensing container that advantageously addresses these issues.

SUMMARY

The present invention includes a feed-dispensing container that resolves the needs discussed in the Background section. A feed dispensing container having features of the present invention comprises a housing unit transected by a plate, such that the housing unit is divided by the plate to form a first chamber and a second chamber. A first aperture exists in the housing unit for access to the first chamber, and a first removable plug, which may be a cap, exists to seal the first aperture. The portion of the housing unit covering the first chamber has one or more openings for dispensing a feed. A second aperture exists in the housing unit for access to the second chamber, and a second removable plug exists to seal the second aperture. A volume of a ballast material may be poured into the second chamber through the second aperture and sealed in by the second plug. The feed may be any common outdoor feed including, but not limited to corn, soy nuts, manufactured protein feed, or mixes of nuts, grains and oats. Feed may be poured into the first chamber through the first aperture and sealed in by a first plug. These features of the present invention allow for the feed-dispensing container to remain within close proximity to a starting location, even after a forceful agitation that dispenses some volume of feed through the one or more openings.

In some embodiments, the openings contain a strengthening reinforcement, such as a metal pipe or washer, to prevent animals from enlarging the openings or reaching inside the container to take hold of the feed.

In some embodiments, the size of the openings is not much larger in diameter than a treat-sized portion of feed, thus preventing feed from pouring out in great volume even if the force of gravity would otherwise favor such pouring.

In some embodiments, the container is spherical, allowing for the animal to roll it and interact with it with some ease. If, however, a proper amount of ballast material is within the second chamber, the container is unlikely to travel far from the place it was deployed by the animal handler. The animal handler is able put in as much ballast material she or he deems necessary to prevent outdoor forces like wind, rain, and wild animals from carrying the container far from a location of initial deployment.

In some embodiments, the container is molded such that the housing and plate are fused together.

In some embodiments, a there are means for attaching one or more auxiliary devices to the container.

The means for attachment allows for the auxiliary devices to be attached or removed from the device by an animal handler, but not upon animal agitation of the container. Such devices may include any subset of: a sound-emitting device, an odor-emitting device, a motion-detector, a location-detector, or a light-emitting device.

In some embodiments, the housing unit is formed from a photoluminescent material. The luminescent property of the material increases visual distinguishability of the container at night time.

The present invention enables a method to feed and train animals. Target animals would begin interacting with a feed-filled container in the initial deployment location with little or no ballast material in the container. Initially, the sum of the weight of the volume of the feed and the ballast material would be great enough to keep the container in close proximity to where it is initially deployed by the animal handler, but low enough so that the animal could interact with the dispenser by pushing it to dispense feed by through the force of gravity. The target animals would associate the container and attached auxiliary devices with food, to produce a Pavlovian effect such that any stimuli mimicking the sound, sight, or smell, associated auxiliary device upon the container would produce an overwhelming hunger or craving response in the target animal. The animal handler would be able to mimic the auxiliary device for the purposes of gathering the gathering animals or incentivizing some performance of the target animal. As the feed within the container diminished, the animal handler would be able to refill the container with ballast material and/or feed to keep the container heavy enough from travelling far from the initial area of deployment.

The present invention enables methods of using the container disclosed in this application to hunt animals. Target animals would begin interacting with a feed-filled container with little or no ballast material in the container. Initially, the sum of the weight of the volume of the feed and the ballast material would be great enough to keep the container in close proximity to where it is initially deployed by the animal handler, but low enough so that the animal could interact with the dispenser by pushing it to make it dispense feed. Over time, the animals would associate the container and attached auxiliary devices with food, to produce a Pavlovian effect such that any stimuli mimicking the sound, sight, or smell, associated with the device would produce an overwhelming hunger or craving response in the target animal. As time progresses, the animal hunter would add more and more ballast material to the container, so that target animal must exert more energy and effort to agitate the container enough for feed to be dispensed. An optimal point in this procedure is defined when the target animal engages the increasingly-static container for a duration that enables the animal hunter to aim a hunting weapon at the target animal and successfully complete the hunt.

The present invention includes a method of manufacturing at some embodiments of the claimed feed dispensing container. The method comprises rotationally molding a polyethylene housing unit that is transected by a plate by using a clamping apparatus to clamp a plate between a first chamber-forming mold and a second chamber-forming mold to create a combined mold, wherein each chamber-forming mold contains a volume of polyethylene powder to form the housing unit. This method of manufacturing the feed dispensing container allows for a relatively low manufacturing cost of a durable feed dispensing unit that cannot be easily severed upon forceful agitation by large ungulated animals.

Several embodiments of the method are disclosed herein.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

Figure 1:
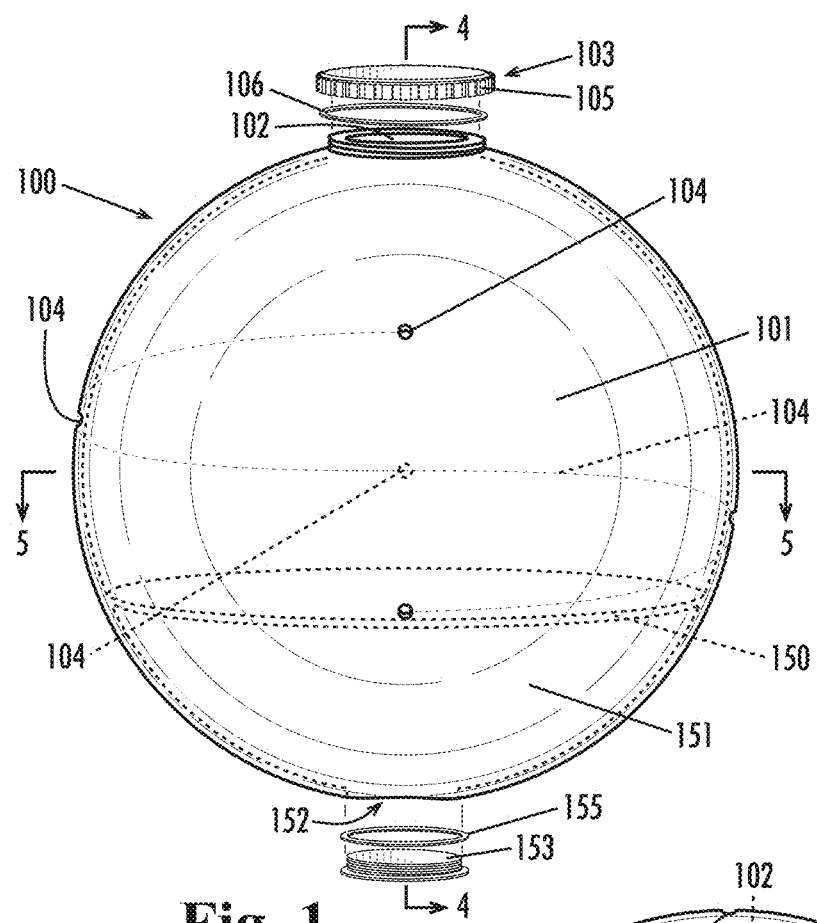
FIG. 1 is a schematic exploded view of one embodiment of a feed-dispensing container without treats or a ballast material inside.
Figure 2:
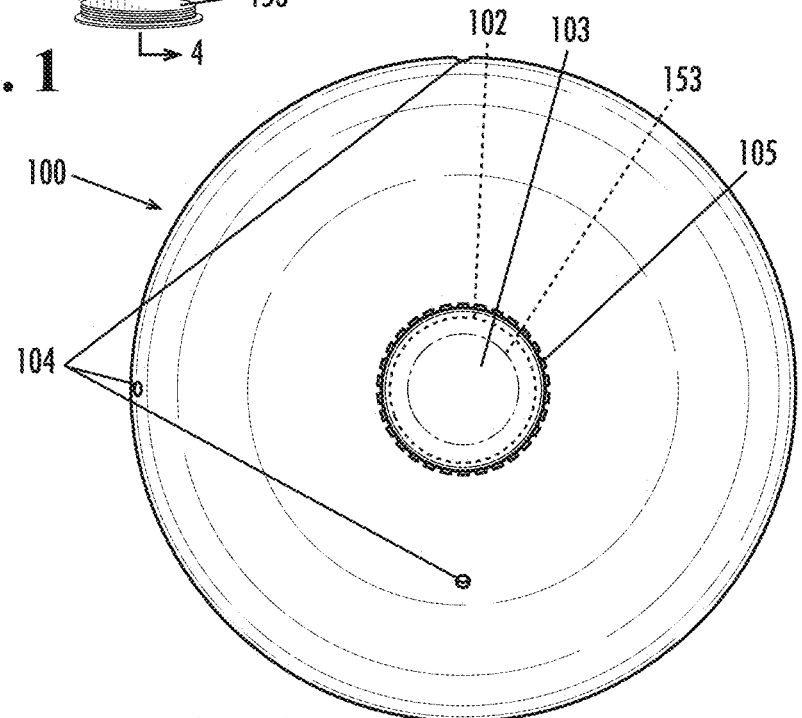
FIG. 2 is a schematic top view of a feed-dispensing container.
Figure 3:
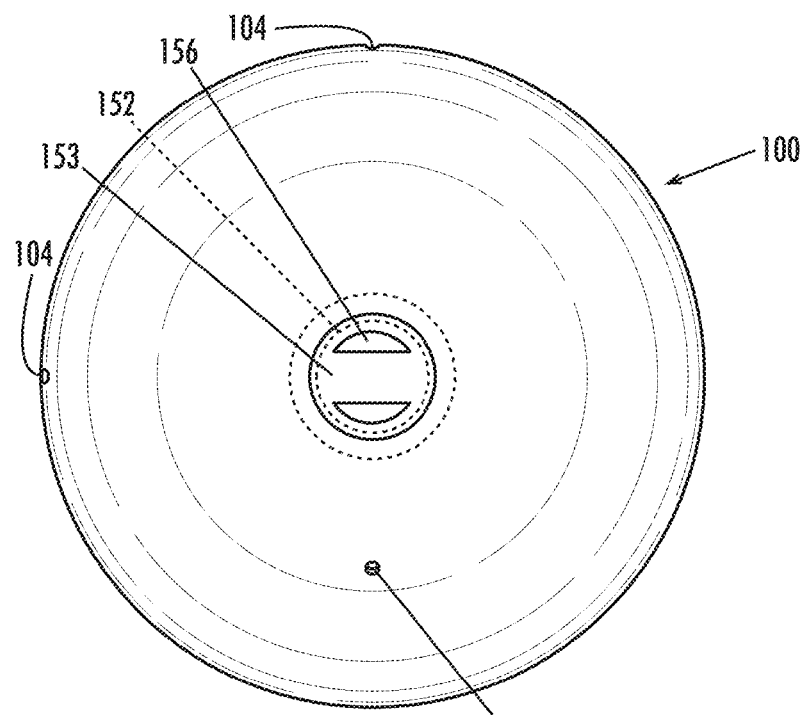
FIG. 3 is a schematic bottom view of a feed-dispensing container.
Figure 4:
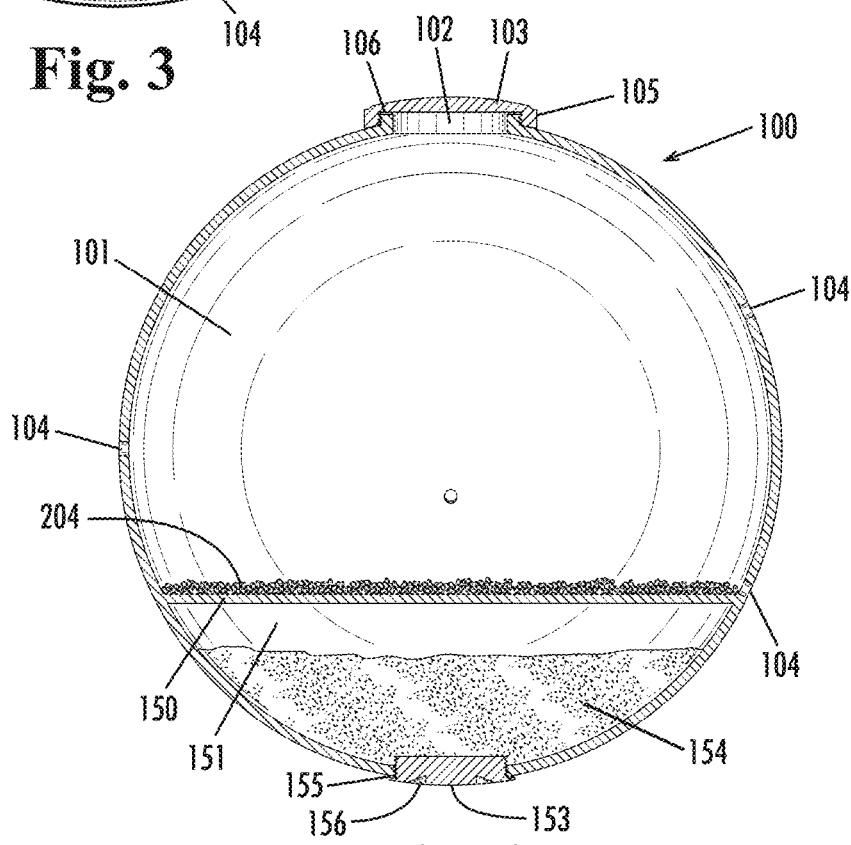
FIG. 4 is a schematic sectional view of a feed-dispensing container with treats and a ballast material inside.
Figure 5:
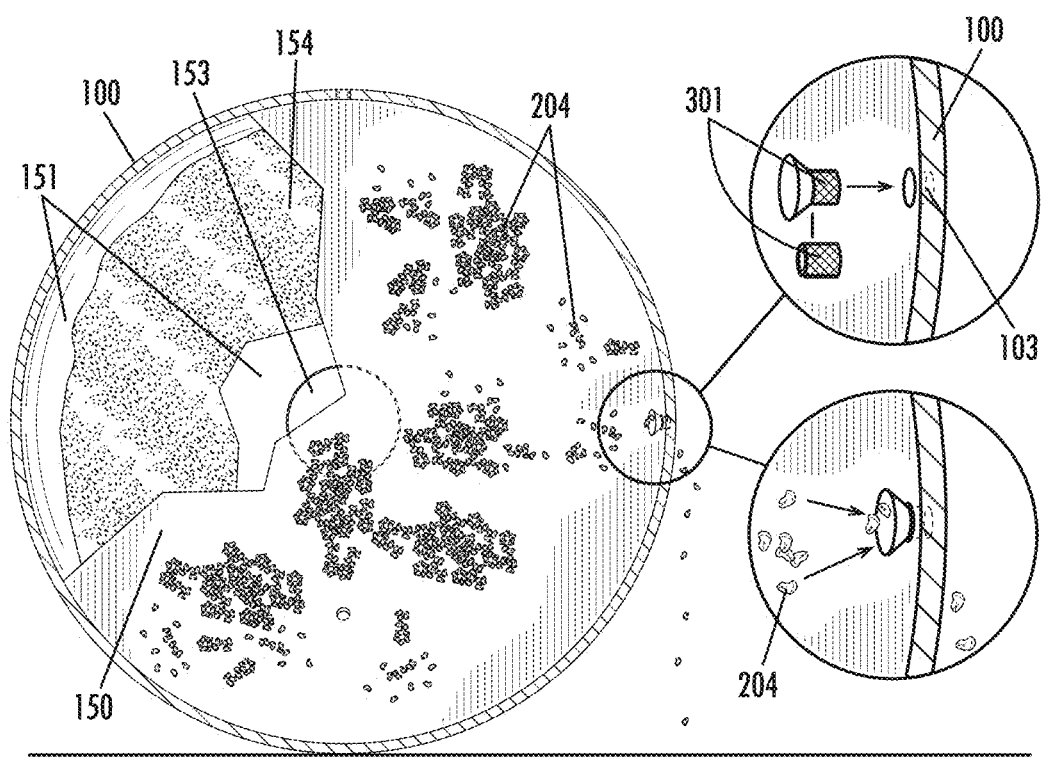
FIG. 5 is a schematic partially broken away top and perspective view of the feed-dispensing container with treats and ballast material inside.
Figure 6:
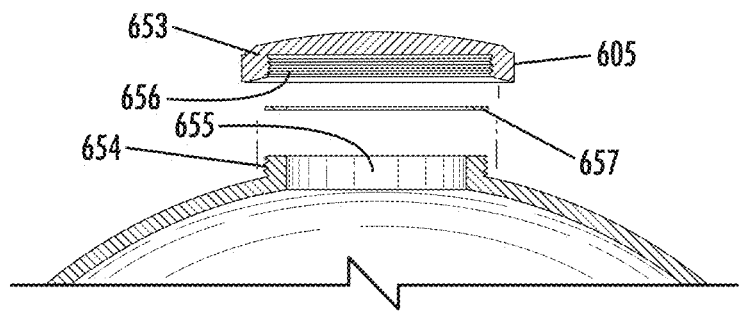
FIG. 6 is a schematic exploded partial view of an aperture, gasket, and a plug of the feed-dispensing container.
Figure 7:
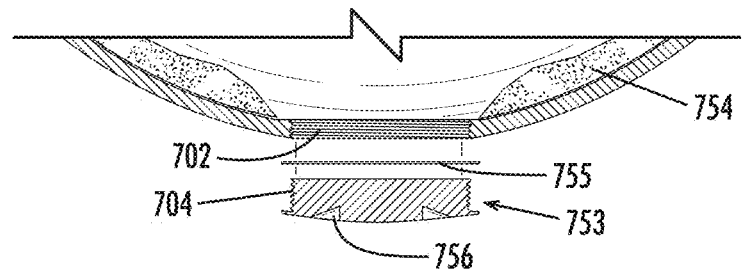
FIG. 7 is a schematic exploded partial view of an aperture, gasket, and a plug of the feed-dispensing container.
Figure 8:
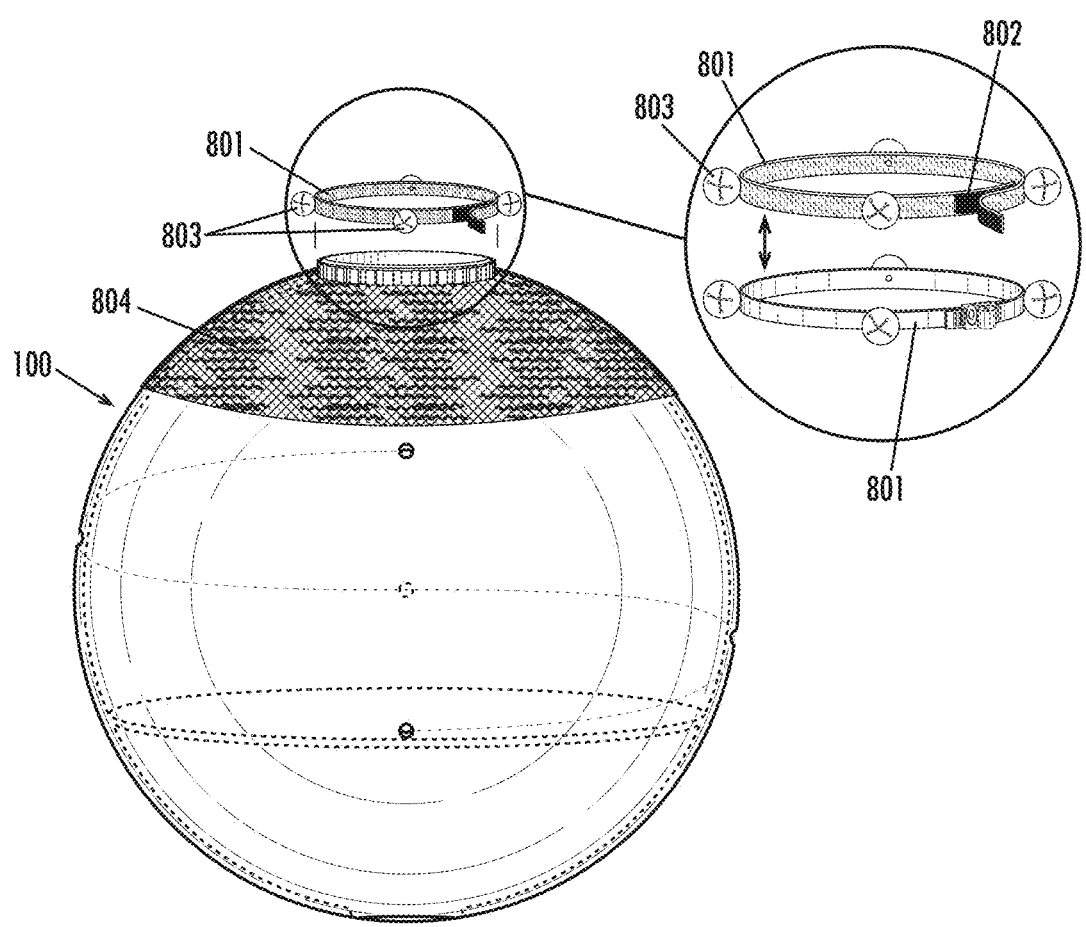
FIG. 8 is a schematic perspective view of the container with a cloth draped over it and an auxiliary device fastening belt exploded away from the feed-dispensing container.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

The present invention is an interactive dispensing feed container that allows for a controlled dispensation of feed. Dispensing feed in a slow, piecemeal manner allows a target animal to continue to engage with the dispenser for a longer duration, thus only enough feed necessary is expelled to act as a treat or entice the target animal. This container prevents feed from going to waste by being stolen by non-target animals. The container has the additional benefit of providing a degree of exercise to the target animals engaging with the dispenser. This invention also prevents an animal handler from having to take the time to dole out specific portions of feed for target animals, and prevents the potential waste from doling out too much at one time. Further, use of this dispenser mimics the natural foraging habits of many ungulated animals.

As will be discussed in more detail infra, this application discloses various embodiments of an interactive feed-dispensing container (FIG. 1) comprising a housing unit (100) transected by a plate (150) such that the housing unit is divided into a first chamber (101) and a second chamber (151). The housing unit of the container may be made of a robust plastic such as polyethylene or a metal such as tin or aluminum. In at least one embodiment of the feed-dispensing container, a first aperture (102) exists in the housing unit for a volume of feed (204) to enter the first chamber, and a first removable plug exists (103) to seal the first aperture. A second aperture (152) exists in the housing unit for a ballast material (154) to enter the second chamber; and a second removable plug (153) exists to seal the second aperture in the second chamber. The apertures allow for the first chamber to be filled with feed and the second chamber to filled with ballast material. One or more openings (104) exist in the portion of the housing unit that covers the first chamber. These openings allowing for dispensation of the feed from the first chamber to the exterior of the housing unit. When the container is acted upon by an animal and the mass of feed in the upper chamber is agitated, a small portion of the feed will spill out of any subset of the openings. The ballast material may be any collection of dense inert material, such as sand, rocks, and/or water, that is able to fit through the second aperture. The ballast material resists agitation, and enables the container to remain close to where the container was initially deployed and in a stable position wherein no feed is dispensed from the first chamber after the container is agitated. This is an improvement over the static, built-in ballasts of several items of the prior art because it allows the user to fill the dispenser with the proper amount of ballast material for the size and strength of the animal to be using it. In this way, the dispenser may be adjusted for use with a variety of animals of varying sizes and strengths, as well as adjusted as appropriate as an animal grows. This embodiment also provides the additional benefit, along with the auditory device discussed below, of training animals to use the dispenser for feed.

According to some embodiments (FIGS. 1-8), the housing may be spherical, allowing easy rotation and agitation when engaged from any direction. A spherical construction allows for these relatively large dispensers to more easily be moved to any desired location of deployment. The term "sphere" and its derivatives are intended to encompass both perfect and imperfect spheres.

In at least one embodiment, the spherical housing unit is made from polyethylene, the diameter of the spherical housing is at least 20 inches, and the thickness of the housing material is at least 0.20 inch.

In at least one embodiment, the housing unit and the plate is rotationally molded as a single unit, thus avoiding structural weaknesses from combining multiple pieces that could eventually fail due to repeated impact and agitation by large, strong, and wild animals.

In at least one embodiment, the spherical housing unit has a volume between 1.5 and 5 cubic feet.

In at least one embodiment (FIG. 6), at least one of the plugs (605) include one or more female threads (656) meant to engage matching male threads (654) on the edges of the apertures (655) such that the plug may be securely screwed on or off.

In at least one embodiment (FIG. 7), at least one of the plugs (753) include one or more male threads (704) meant to engage one or more matching female threads (702) on the edges of the apertures such that the plug may be securely screwed on or off. The plug contains a handgrip (756) to facilitate handling the plug to screw it on or off.

In at least some of the embodiments (FIGS. 1,6,7), when sealing the apertures, each of the plugs engages with a gasket (106, 155, 657, 755) that sits on top of the housing and circles the aperture.

In at least one embodiment (FIG. 5), each of the plurality of openings contains a strengthening reinforcement (301) to prevent pest animals from reaching inside the container and taking hold of the feed. Such strengthening reinforcement may be tubular reinforcements or an increased thickness of the material forming the housing unit around each opening. In at least one embodiment, the strengthening reinforcement is a 0.5 inch schedule 40 pipe that has a length of 1.5 inches.

In at least one embodiment (FIG. 6), each of the plugs (653) include a female threading (654) on the edge of the plug meant to engage with any one of the apertures (655), and a matching male threading (656) on the edges of the apertures such that the plug may be securely screwed on or off.

In at least one embodiment, the housing unit is formed from visually distinguishable material such as a photoluminescent material or a plastic died a bright color, to give the container visual distinguishability during the day or night.

In at least one embodiment (FIG. 8), a means for attaching auxiliary devices exists around the first aperture. Such means may be a hook, a snap-fit unit, or a belt (801). Auxiliary devices may include any combination of an auditory device, a locator device, light-emitting device, motion sensor, or an odor-emitting device.

In some of the embodiments with the means for attaching auxiliary devices, the auditory device may be one or more bells (803) or an electronic buzzer. Such would be attached to the feed dispensing container such that when the container is agitated, the auditory device will emit noise capable of being heard by the animals. An auditory device will help train animals to expect feed when such noise is heard by the animals.

In some of the embodiments with the means for attaching auxiliary devices, the locator device enables global position systems to locate the device. This device enables discovering the location of the feed dispensing container in case it is lost. This device also enables aerial drones to locate the device and capture footage of its use.

In some of the embodiments with the means for attaching auxiliary devices, the odor-emitting device may be a substance-soaked cloth (804), such as an animal attractant- or repellant-soaked towel.

Figure 9:
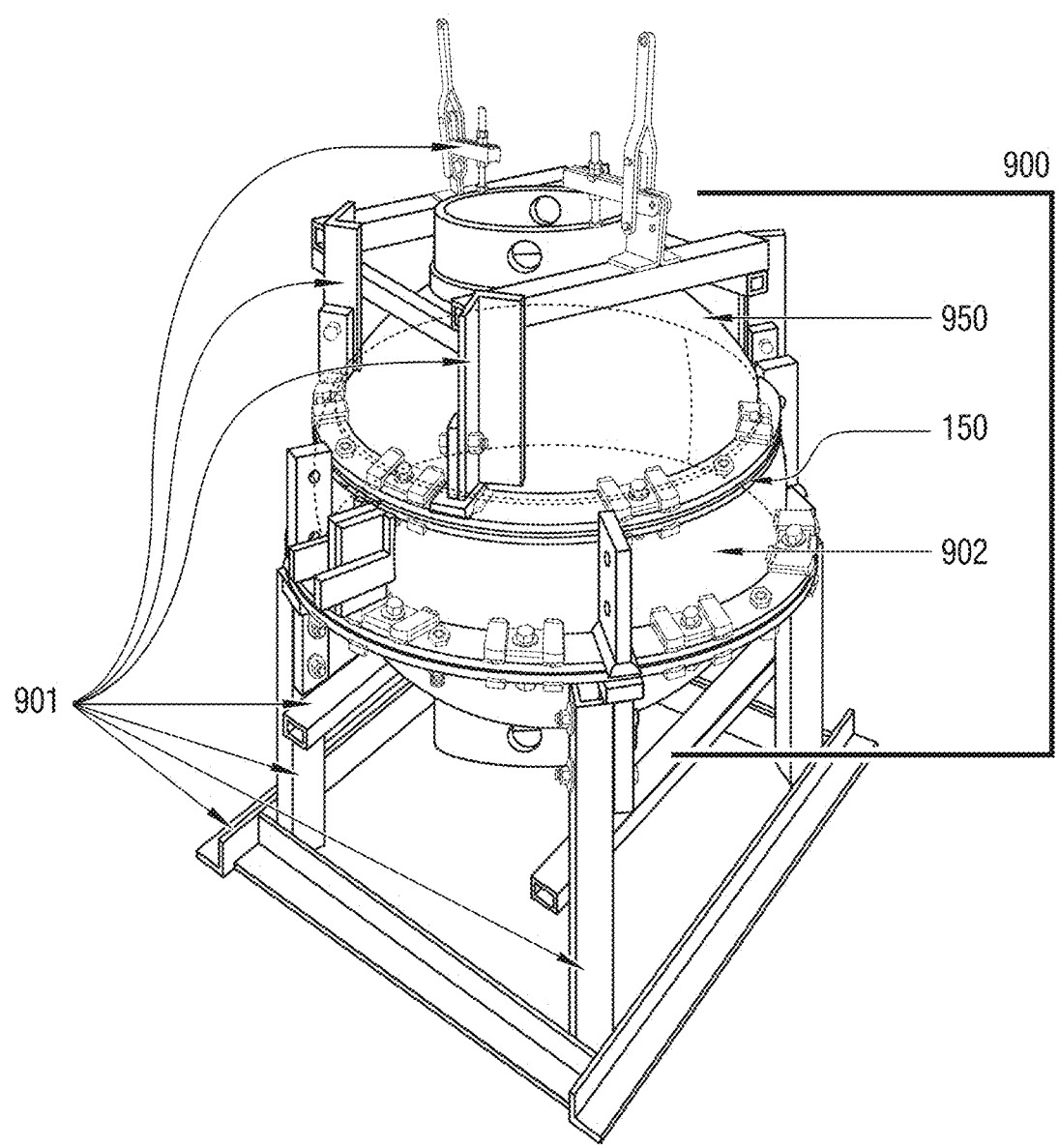
FIG. 9 is a schematic perspective view of a combined mold used for rotationally molding some embodiments of a feed-dispensing container.

The present invention includes embodiments of a rotational molding method of manufacturing a spherical feed dispensing container (FIGS. 9, 10, 11, 12). FIG. 9 shows a schematic perspective view of a combined mold used for rotationally molding some embodiments of a feed-dispensing container. The rotational molding method comprises using a clamping apparatus to clamp a plate (150) between a first chamber-forming mold (902) and a second chamber folding mold (950) to create the combined mold (900), whereby each chamber-forming mold contains a polyethylene powder to form a housing unit of the feed-dispensing container. The chamber-forming molds are made of any durable metal, such as aluminum, carbon steel, or stainless steel.

Figure 10:
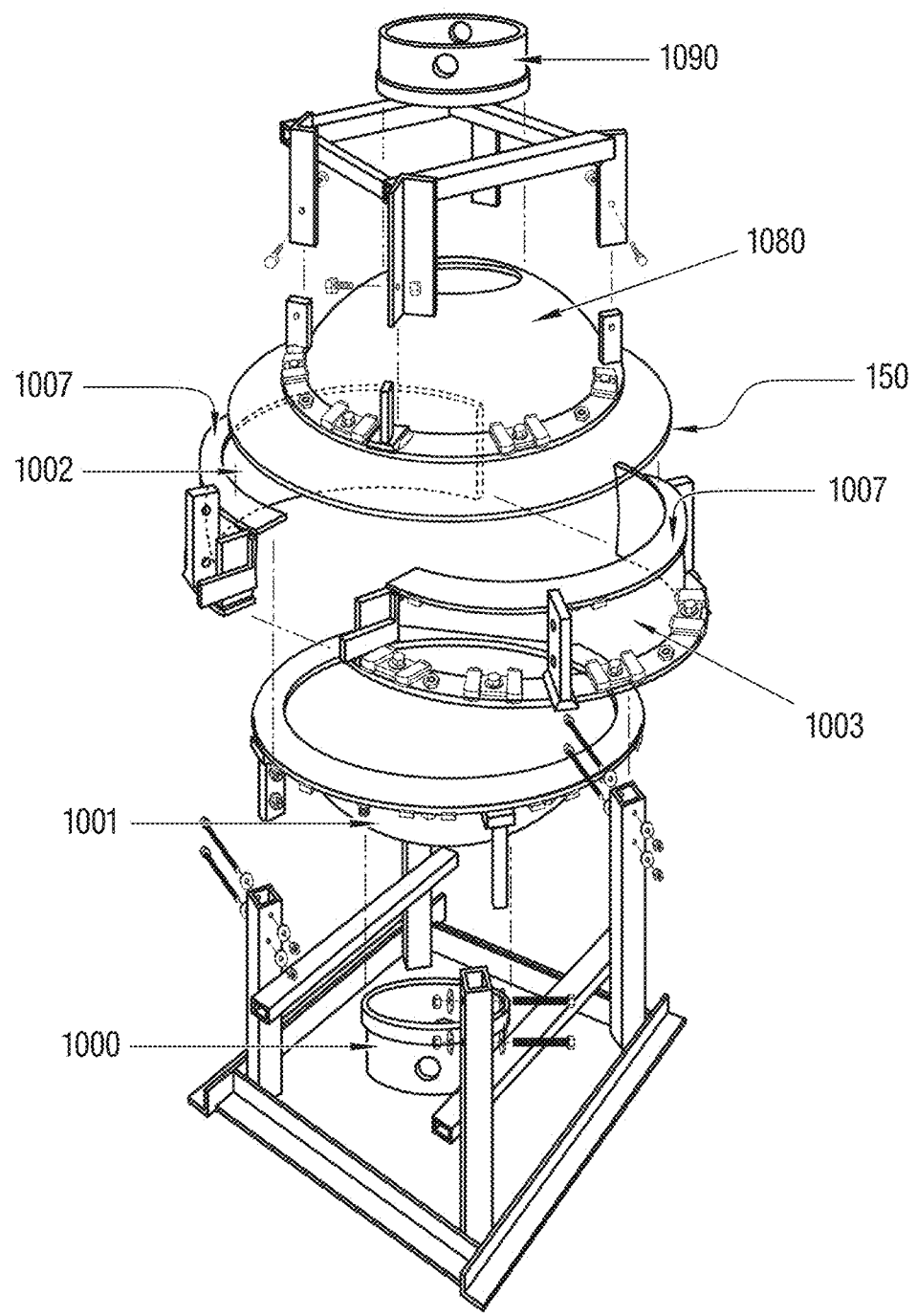
FIG. 10 is a schematic exploded view of at least one embodiment of a combined mold of a feed-dispensing container with a plate transecting the combined mold.

FIG. 10 is a schematic exploded view of at least one embodiment of the combined mold of a feed-dispensing container that illustrates the relative positioning of the combined mold parts. In at least one embodiment of the method, the first chamber mold is prepared by assembling a first socket-forming part (1000) with an enclosing top (FIG. 11, 1301) at a base of a dome-forming part (1001), and then placing one or more curved parts (1002, 1003) on top of the dome-forming part, such that the first chamber mold forms a hollow dome.

Figure 11:
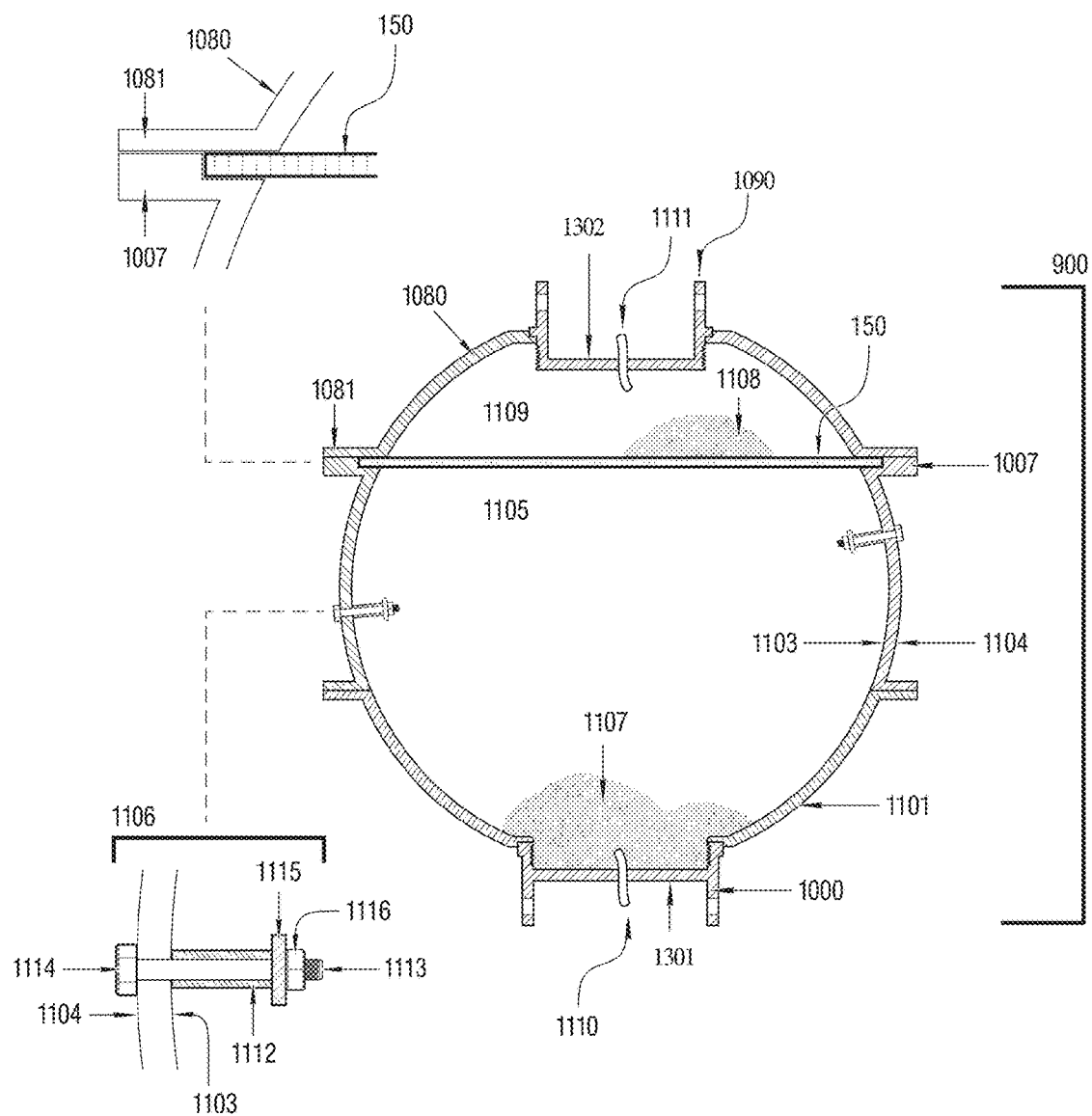
FIG. 11 is a schematic cross-sectional view of at least one embodiment of combined mold for a feed dispensing container with opening-forming parts, a plate, and unmelted polyethylene powder inside the combined mold.

FIG. 11 is a schematic cross-sectional view of at least one embodiment of the combined mold for a feed dispensing container with one or more opening-forming parts, a plate, and volumes of an unmelted polyethylene powder inside the combined mold. The first chamber mold (1102) has an interior side (1103) and an exterior side (1104), a first cavity and a first rim (1007). The dome-forming part is a hollow spherical segment. The wall of the hollow dome contains one or more holes (1105). Opening-forming assemblies (1106) are inserted into each opening. A first volume of a polyethylene powder (1107) is poured into the first cavity of the first chamber mold. The plate (105) is placed into the first rim (1007) to cover the first cavity and powder inside the first chamber. A second volume (1108) of a polyethylene powder is poured on top of the plate. A second dome-forming part (1080) with a second rim (1081), a second cavity (1109), and a second socket-forming part (1090) with a enclosing top (1302) is assembled on top of the plate so that the second volume of polyethylene powder that is on top of the plate is enclosed within the cavity of the second chamber mold and the plate. The molds are clamped together to form the combined mold. Both the first socket-forming part and the second socket-forming part each have a teflon vent (1110, 1111) to normalize air pressure within the combined mold during rotational molding.

In at least one embodiment of the method, the combined mold (900) is placed in a rotational molding machine for rotationally molding and melting the polyethylene powder to a resulting polyethylene liquid resin so that the resulting liquid resin contacts and adheres the plate to securely fuse the plate into the feed dispenser. After reaching a temperature, the liquid resin is allowed to cool, thus the liquid resin solidifies while the combined mold continues to rotate. After cooling is complete, the rotation is stopped, the combined mold and opening-forming molds are unclamped and disassembled, and a spherical feed dispensing container is released. The result is that the plate transects the spherical feed dispensing container to create a first chamber and a second chamber. Apertures for each of the chambers of the feed-dispensing container are then created by cutting away polyethylene material that was adjacent to a first socket of the first chamber and a second socket of a second chamber. The washers and nuts of the opening-forming assemblies are removed from the first chamber mold through the chamber's aperture. A first plug is fit upon an aperture in a first chamber of the feed dispensing container, and a second plug is fit upon an aperture in a second chamber (FIG. 1).

In some embodiments, the divider plate is made from higher density polyethylene than the polyethylene of the powders used. In at least some embodiments, the plate is created from high-density polyethylene.

The powder contained within each of the chamber forming parts is medium-density polyethylene, having a density of 0.926-0.951 g/cm$^3$.

In at least one embodiment of the method, the step of inserting the opening-forming assembly (1106) into the first chamber mold comprises inserting in at least one hole of the first chamber mold (902) a strengthening metal pipe (903) and securing it in place by placing a bolt (1113) with a head (1114) and a shaft through the hole so that the head (1114) protrudes from the opening at the exterior side (1104) of first chamber forming mold and the shaft passes through the hole to the interior side (1103) of the first chamber forming part, where it is secured with a washer (1115) and a nut (1116). In at least some embodiments, the washer is made from teflon material.

In at least one embodiment of the method, steps of pouring polyethylene powder is calibrated so that the volume of powder poured will form a layer that is at most as thick in width as the depth of the plate.

Figure 12:
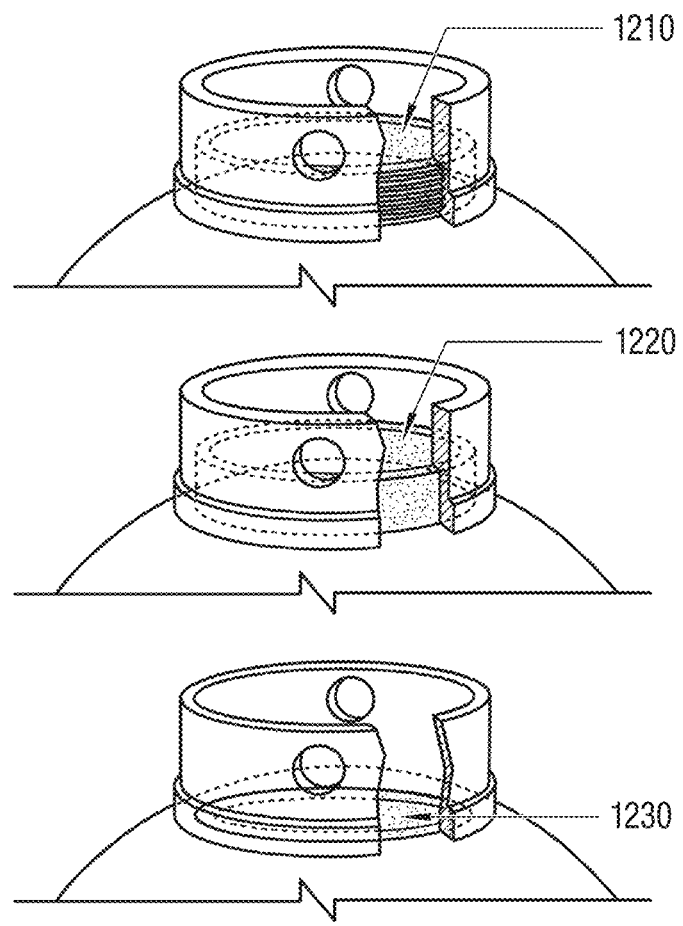
FIG. 12 is a top perspective view of some different embodiments of a socket created by some different embodiments of socket-forming part.

FIG. 12 is a top perspective view of some different embodiments of a partial socket-forming part (partial because each part is without an enclosing top) to illustrate the sockets of the feed-dispending container that the parts create. In at least some embodiments of the method, at least one of the socket forming parts completes the spherical shape of the dome without molding threads or a flange (1220). In at least some embodiments of the method, at least one of the socket forming parts molds a set of threads (1210).

In at least some embodiments of the method, at least one of the socket forming parts molds a flange (1230). In at least some embodiments, at least one of socket forming parts is placed so that it extends into the cavity of one of the chambers of the combined mold, rather than extending to the exterior of the feed-dispensing container. This allows for female threads or flanges to be created. In some embodiments, the socket forming mold is placed so that it protrudes from the exterior of a chamber-forming mold.

In some embodiments of the method, threads are created in the second aperture of the feed-dispensing container using a rotational molding method by which pre-formed cylindrical unit with a textured exterior and smooth interior is inserted into the aperture and fused with it. This allows for the socket-forming mold to have thread-forming parts while enabling the feed dispensing container to be more spherical because a smaller aperture is cut into it than a thread-forming socket mold could make.

At least one embodiment of the method produces a spherical feed-dispensing container with an interior volume between 3.5 and 4.1 cubic feet. In this method, the combined mold is comprised of aluminum and has a thickness of 0.25 inches. The combined mold encloses a volume between 4.1 and 5 cubic feet. The plate clamped between the combined molds is 0.25 inch thick and is composed of high density polyethylene. The plate has a diameter of 22.25 inches. A volume of medium density polyethylene powder between 4,000 cubic centimeters and 5,000 cubic centimeters is within the first chamber forming mold, and a volume of medium density polyethylene powder between 1,900 cubic centimeters and 2,000 cubic centimeters is within the second chamber forming mold. These volumes of polyethylene powder allow for the housing unit of the spherical-dispensing container to have a wall that is at most as thick as the plate. The opening-forming assemblies each contain an aluminum strengthening pipe that has a length of 1.5 inch and has a 0.62 inner diameter.

The combined mold is rotationally molded with rotation speed between 3.5 and 4 revolutions per minute and heated to a temperature between 500 degrees Fahrenheit and 600 degrees Fahrenheit before it is cooled to solidify.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A feed dispensing container, comprising:
a housing unit fused to and transected by
a plate, such that the housing unit is divided by the plate to form
a first chamber and
a second chamber; wherein
a first aperture exists in the housing unit for access to the first chamber, and
a first removable plug exists to seal the first aperture, and
a portion of the housing unit covering the first chamber has a plurality of small openings, wherein each of the plurality of openings contains a strengthening reinforcement; and
a second aperture exists in the housing unit for access to the second chamber, and
a second removable plug exists to seal the second aperture in the second chamber;
such that a volume of a ballast material poured into the second chamber through the second aperture and sealed in by the second plug;
and a volume of a feed poured into the first chamber through the first aperture and sealed in by a first plug;
such that when the ballast material is inside the second chamber, the container rests in a stable position; yet upon forceful agitation of the container, feed is dispensed from the plurality of openings; and after forceful agitation ceases, the container returns to the stable position wherein no feed is dispensed.

2. The container of claim 1, wherein:
the container is rotationally molded such that the housing unit and plate are fused together.

3. The container of claim 1, wherein:
there exists a means for attaching one or more auxiliary devices to the container;
wherein the auxiliary devices may be attached or removed from the device by an animal handler, but not upon animal agitation of the container.

4. The container of claim 1, wherein:
the housing unit is formed from a photoluminescent material;
wherein the luminescent property of the photoluminescent material increases visual distinguishability.

5. A method of manufacturing an embodiment of the feed dispensing container of claim 1, the method comprising rotationally molding a polyethylene housing unit that is transected by a plate by using a clamping apparatus to clamp a plate between a first chamber-forming mold and a second chamber-forming mold to create a combined mold, wherein each chamber-forming mold contains a volume of polyethylene powder to form the housing unit.

6. The method of claim 5, the method further comprising:
(a) preparing the first chamber mold with an interior side and an exterior side by assembling a first socket-forming part at a base of a dome-forming part, and then placing one or more curved parts at a top of the dome-forming part, such that the first chamber mold forms a hollow dome;
(b) inserting one or more opening-forming assemblies into the first-chamber forming mold;
(c) pouring a first volume of a polyethylene powder in the first chamber;
(d) placing the plate on top of the first chamber;
(e) pouring a second volume of the polyethylene powder on top of the plate;
(f) assembling the second chamber mold on top of the plate so that it surrounds the second volume of polyethylene powder on top of the plate;
(g) placing a second socket-forming part on the second chamber mold;
(h) clamping together the chamber-forming molds to form the combined mold;
(i) placing the combined mold on a rotational molding machine for heated rotational molding to melt the polyethylene powders to a liquid polyethylene resin, so that the liquid polyethylene resin contacts and covers the plate to securely fuse the plate into the feed dispensing container;
(j) allowing the polyethylene liquid resin to cool while continuing to rotate the combined mold, and stopping rotation once the liquid polyethylene resin solidifies;
(k) unclamping and then disassembling the combined mold, then removing the opening-forming assemblies, and then removing the first chamber-forming mold and the second chamber-forming mold so that a spherical feed dispensing container is released from the combined mold;
(l) creating a first aperture and a second aperture in the feed dispensing container;
(m) fitting a first plug upon the first aperture in a first chamber of the feed dispensing container; and
(n) fitting a second plug upon the second aperture in a second chamber of the feed dispensing container.

7. The method as claimed in claim 6, wherein:
step (b) of inserting opening molds into the first chamber-forming mold comprises inserting in at least one opening of the first-chamber forming mold a strengthening metal pipe, and securing it in place by placing a bolt with a head and a shaft through the opening so that the head protrudes from the exterior side of the chamber-forming mold and the shaft passes through the opening to the interior side of the chamber-forming mold, where it is secured with a washer and a nut.

8. The method as claimed in claim 7, wherein:
steps (c) and (e) of pouring the polyethylene powder is calibrated so that the polyethylene powder will form a layer that is at most as thick in width as the depth of the plate.

9. The method as claimed in claim 7, wherein creating the second aperture comprises rotationally molding a threaded cylindrical unit into the feed dispensing container.

* * * * *